(12) United States Patent
Matsuda et al.

(10) Patent No.: US 10,654,730 B2
(45) Date of Patent: May 19, 2020

(54) LIQUID PROCESSING APPARATUS

(71) Applicant: Panasonic Intellectual Property Management Co., Ltd., Osaka (JP)

(72) Inventors: Genichiro Matsuda, Nara (JP); Gaku Miyake, Osaka (JP); Hiromi Matsumoto, Osaka (JP); Yoshio Yamada, Hyogo (JP); Yukiko Kitahara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/262,239

(22) Filed: Jan. 30, 2019

(65) Prior Publication Data

US 2019/0352199 A1     Nov. 21, 2019

(30) Foreign Application Priority Data

May 16, 2018 (JP) ................. 2018-094918

(51) Int. Cl.
 *C02F 1/46* (2006.01)
 *B01J 19/08* (2006.01)
 *C02F 1/32* (2006.01)

(52) U.S. Cl.
 CPC ........... *C02F 1/4608* (2013.01); *B01J 19/088* (2013.01); *C02F 1/325* (2013.01);
 (Continued)

(58) Field of Classification Search
 CPC .......... C02F 1/4608; C02F 1/32; C02F 1/325; C02F 1/008; C02F 1/46109; C02F 1/46123; C02F 2201/46175; C02F 2301/026; C02F 2303/04; C02F 2305/023; B01J 19/088; B01J 2219/0894; B01J 2219/0877; B01J 2219/0809; B01J 2219/0869; B01J 2219/0818; B01J 2219/082; B01J 2219/0822; B01J 2219/0826

See application file for complete search history.

(56) References Cited

U.S. PATENT DOCUMENTS 4,801,435 A     1/1989  Tylko
2011/0229656 A1  9/2011  Shibata et al.
(Continued)

FOREIGN PATENT DOCUMENTS

EP   2072471      6/2009
JP   2006-130410  5/2006
(Continued)

*Primary Examiner* — Lessanework Seifu
(74) *Attorney, Agent, or Firm* — Wenderoth, Lind & Ponack, L.L.P.

(57) ABSTRACT

A liquid processing apparatus includes a processing tank, a first electrode, an insulator, a liquid introduction port, a discharge portion, a second electrode, an opening portion, and a power supply. The first electrode is disposed at the first end of the processing tank. The insulator covers at least a part of a side surface of the first electrode disposed to protrude from an inner wall of the first end of the processing tank into the processing tank. The liquid introduction port causes a liquid to swirl by introducing the liquid in a tangential direction of the processing tank and generates a gas phase in a swirling flow of the liquid. An outer diameter of the insulator is smaller than an outer diameter of a gas-phase generating space where the gas phase is generated in the processing tank.

8 Claims, 17 Drawing Sheets

(52) U.S. Cl.
CPC ............... *B01J 2219/0809* (2013.01); *B01J 2219/0869* (2013.01); *B01J 2219/0877* (2013.01); *C02F 2301/026* (2013.01); *C02F 2303/04* (2013.01); *C02F 2305/023* (2013.01)

(56) References Cited

U.S. PATENT DOCUMENTS

| | | |
|---|---|---|
| 2016/0145123 A1 | 5/2016 | Lai et al. |
| 2017/0291830 A1 | 10/2017 | Kang |
| 2018/0230027 A1 | 8/2018 | Miyake et al. |

FOREIGN PATENT DOCUMENTS

| | | |
|---|---|---|
| JP | 2007-207540 | 8/2007 |
| JP | 2009-235559 | 10/2009 |
| JP | 2009-255027 | 11/2009 |
| JP | 2017-225965 | 12/2017 |

FIG. 9

| DIAMETER OF OPENING PORTION [mm] | OUTER DIAMETER D2 OF GAS PHASE [mm] | RATIO OF OUTER DIAMETER D2 OF GAS PHASE TO DIAMETER D3 OF OPENING PORTION | OUTER DIAMETER D1 OF INSULATOR TO BE ALLOWED [mm] | RATIO OF OUTER DIAMETER D1 OF INSULATOR TO DIAMETER D3 OF OPENING PORTION |
|---|---|---|---|---|
| 4 | 1.2 | 34% | 1.1 | 28% |
| 3 | 1 | 33% | 0.9 | 30% |
| 2.5 | 0.8 | 32% | 0.7 | 28% |
| 2 | 0.6 | 30% | 0.5 | 25% |

LIQUID PROCESSING APPARATUS

BACKGROUND

1. Technical Field

The present disclosure relates to a liquid processing apparatus for electrochemically processing a liquid. More specifically, the present disclosure relates to a liquid processing apparatus for processing a liquid by simultaneously generating decomposing and sterilizing action by direct contact between contaminants or bacteria contained in the liquid and plasma by generating the plasma in the liquid, and the decomposing and sterilizing action by ultraviolet light, radicals, or the like generated by plasma discharge.

2. Description of the Related Art

FIG. 14 illustrates an example of a liquid processing apparatus of the related art described in Japanese Patent Unexamined Publication No. 2017-225965. Liquid processing apparatus 100 includes apparatus body 110, liquid supplier 150, pipe 151, storage tank 190, and power supply 160. Apparatus body 110 includes processing tank 112, introduction portion 115, discharge portion 117, first electrode 130, and second electrode 131.

FIG. 15 is a view illustrating a state where the liquid processing apparatus of the related art operates. Liquid L1 is introduced from introduction portion 115 provided in a tangential direction of cylindrical processing tank 112 to generate swirling flow F1. A pressure in a vicinity of central axis X1 of processing tank 112 is lowered to a saturated water vapor pressure or less by swirling flow F1. As a result, water vapor is generated by vaporizing a part of liquid L1 in the vicinity of central axis X1 and thereby gas phase G is generated. The plasma discharge is generated in gas phase G by applying a high voltage between first electrode 130 and second electrode 131. In this case, the plasma comes into direct contact with contaminants or bacteria, so that the contaminants or the like contained in the liquid is decomposed. At the same time, for example, components having oxidizing power such as hydroxyl radical (OH radical) and hydrogen peroxide are generated and the decomposition process progresses even if these components react with the contaminants or the like contained in the liquid. Among the radicals generated by the generation of the plasma in water, OH radicals are known to have high oxidizing power in particular, and it is possible to decompose hardly decomposable organic compounds dissolved in the liquid. Further, gas phase G containing an oxidation component in the vicinity of discharge portion 117 is sheared by receiving a resistance of water in storage tank 190, and generates bubbles B containing the oxidation component. Since not only the oxidation components such as OH radicals and hydrogen peroxide but also bubbles B are contained in processing liquid L2, it is possible to more efficiently decompose contaminants and the like contained in the liquid.

SUMMARY

A liquid processing apparatus includes a processing tank, a first electrode, an insulator, a liquid introduction port, a discharge portion, a second electrode, an opening portion, and a power supply.

The processing tank is cylindrical and a first end thereof opens.

The first electrode has rod shape and is disposed at the first end of the processing tank.

The insulator covers at least a part of a side surface of the first electrode disposed to protrude from an inner wall of the first end of the processing tank into the processing tank.

The liquid introduction port causes a liquid to swirl by introducing the liquid in a tangential direction of the processing tank and generates a gas phase in a swirling flow of the liquid.

The discharge portion is disposed at a second end of the processing tank and discharges the liquid introduced from the liquid introduction port.

The second electrode has a plate shape and is disposed at the second end of the processing tank.

The opening portion is formed in the second electrode with a central axis of the processing tank as a center.

The power supply applies a voltage between the first electrode and the second electrode.

An outer diameter of the insulator is smaller than an outer diameter of a gas-phase generating space where the gas phase is generated in the processing tank.

BRIEF DESCRIPTION OF THE DRAWINGS

FIG. 9 is a table illustrating a thickness of the gas phase in a case where a diameter of an opening portion of the liquid processing apparatus according to Exemplary Embodiment 1 is changed;

DETAILED DESCRIPTIONS

Figure 1:
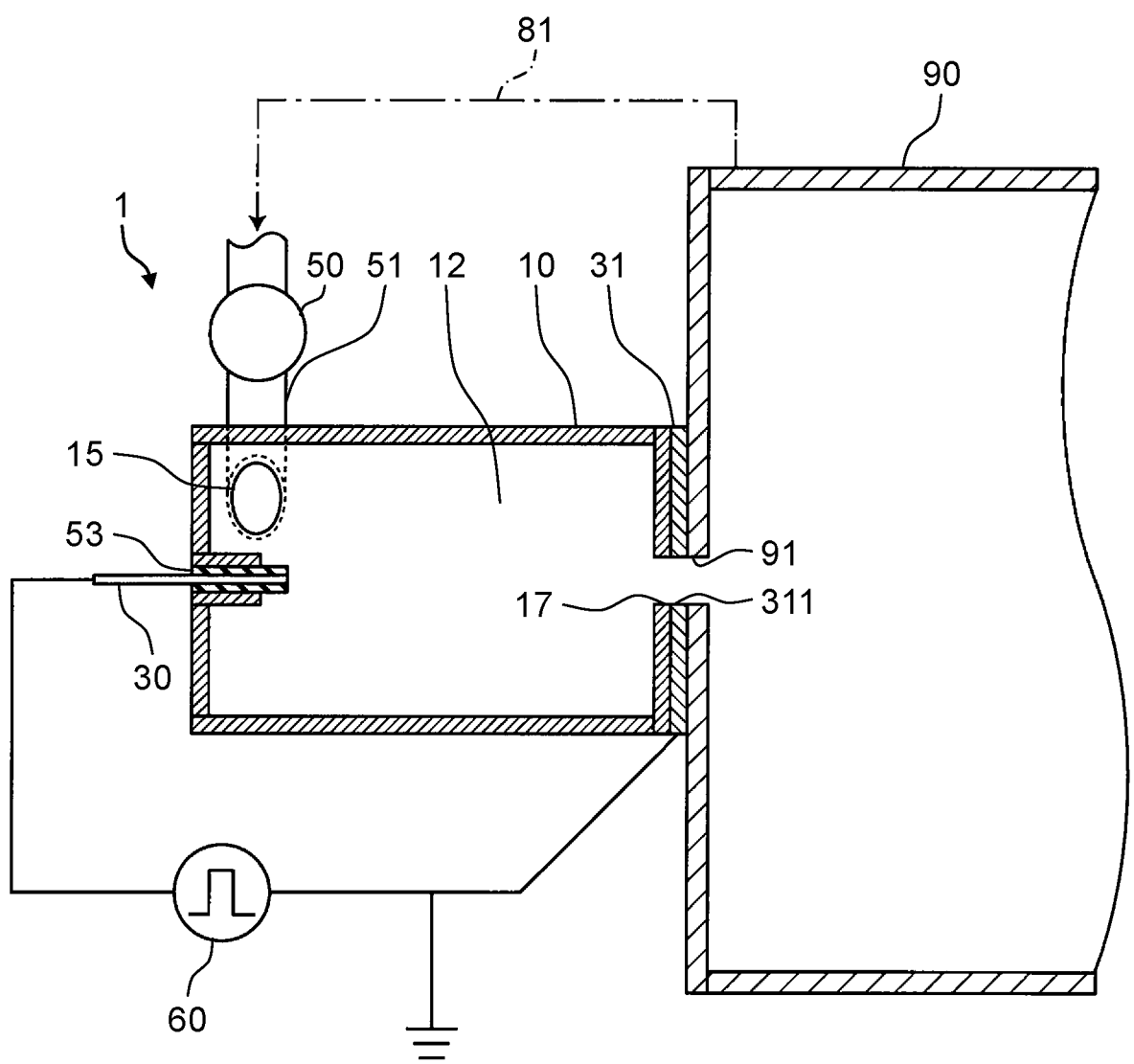
FIG. 1 is a side sectional view illustrating a configuration of a liquid processing apparatus according to Exemplary Embodiment 1.
Figure 1:
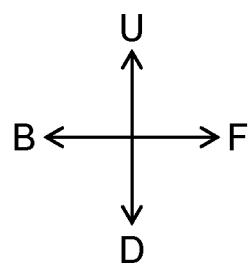

In a liquid processing apparatus described in Japanese Patent Unexamined Publication No. 2017-225965, gas phase G and second electrode 131 are electrically connected via water. Therefore, when a high voltage is applied between first electrode 130 and second electrode 131, there are two paths through which a current flows. One is a current path that flows through current path r1 passing through the plasma generated in gas phase G from first electrode 130, and then flows from the vicinity of discharge portion 117 through current path r2 passing through liquid L1 to second electrode 131. The other is current path r3 that directly flows from first electrode 130 through liquid L1 to second electrode 131. In a case where an electric conductivity of liquid L1 is high, when plasma is generated, a leakage current flowing through current path r3 flowing only through liquid L1 without passing through the plasma increases. When the leakage current increases, electrolysis generated at a portion where first electrode 130 and liquid L1 come into contact with each other occurs severely, and the wear of the electrode of first electrode 130 due to the electrolysis significantly progresses. If a tip of first electrode 130 wears due to the electrode wear, disturbance occurs in gas phase G formed by the swirling flow of liquid L1. Furthermore, since first electrode 130 becomes short, a discharge distance changes. Due to the cause described above, plasma discharge cannot be stably generated for a long time.

Exemplary Embodiment 1

Hereinafter, liquid processing apparatus 1 according to an exemplary embodiment of the present disclosure will be described with reference to the drawings in detail. The same reference numerals are given to the same or corresponding portions and description thereof will not be repeated. For ease of explanation, in the drawings referred to below, the configuration is simplified or schematically illustrated, and some configuration members are omitted. In addition, a dimensional ratio between the configuration members illustrated in each drawing does not necessarily indicate an actual size ratio.

Overall Configuration

First, an overall configuration of liquid processing apparatus 1 will be described.

FIG. 1 is a side sectional view illustrating a configuration of liquid processing apparatus 1 according to Exemplary Embodiment 1 of the present disclosure. In the drawings referred to below, arrow F indicates a forward direction of liquid processing apparatus 1 and arrow B indicates a backward direction. Arrow U indicates an upward direction and arrow D indicates a downward direction. Arrow R indicates a rightward direction as viewed from the backward direction and arrow L indicates a leftward direction as viewed from the backward direction.

Liquid processing apparatus 1 illustrated in FIG. 1 indicates a state of being connected to storage tank 90. Liquid processing apparatus 1 and storage tank 90 may be combined to form a liquid processing system. Liquid processing apparatus 1 processes a liquid by discharging in a liquid. In Exemplary Embodiment 1, a state where an aqueous solution in which contaminants are dissolved is processed will be described. Processing liquid L2 processed by liquid processing apparatus 1 is stored in storage tank 90.

Liquid processing apparatus 1 includes at least processing tank 12, first electrode 30, insulator 53, second electrode 31, and power supply 60. More specifically, liquid processing apparatus 1 includes apparatus body 10, liquid supplier 50, and power supply 60. Apparatus body 10 includes processing tank 12, introduction portion 15, discharge portion 17, first electrode 30, and second electrode 31. First electrode 30 is covered with insulator 53. Introduction portion 15 functions as an example of a liquid introduction port. Processing tank 12 is a portion for liquid (for example, water) L1 introduced inside. A front sectional shape of processing tank 12 is circular (see FIG. 3). Processing tank 12 has a cylindrical processing chamber having a circular cross-sectional shape orthogonal to swirling axis (in other words, central axis) X1 of liquid L1 of processing tank 12. Introduction portion 15 is disposed on one end side (first end) of processing tank 12 and discharge portion 17 is disposed at the other end side (second end) of processing tank 12. Introduction portion 15 introduces the liquid into processing tank 12. Introduction portion 15 communicates with liquid supplier 50 via pipe 51. Discharge portion 17 discharges processing liquid L2 processed in processing tank 12 from processing tank 12. Discharge portion 17 is connected to intake 91 of storage tank 90 and processing liquid L2 discharged from discharge portion 17 is discharged and stored in storage tank 90 via intake 91. A material of processing tank 12 may be an insulator or a conductor. In a case of the conductor, it is necessary to interpose an insulator between processing tank 12 and first electrode 30, and between processing tank 12 and second electrode 31 (see FIG. 5).

First electrode 30 has a rod shape. A portion of first electrode 30 other than a portion exposed to an outside from processing tank 12 is covered with insulator 53. In Exemplary Embodiment 1, in first electrode 30, at least a side surface of a portion protruding from electrode support cylinder 24 into the processing tank and a portion in a vicinity of electrode support cylinder 24 may be covered with insulator 53. That is, the side surface of a portion of first electrode 30 protruding from a wall of processing tank 12 to be disposed on one end side into processing tank 12 may be covered with insulator 53. As an example, as illustrated in FIG. 1, if both a portion of first electrode 30 supported by electrode support cylinder 24 and a portion of first electrode 30 protruding from electrode support cylinder 24 into the processing tank are covered with insulator 53, it is easier to manufacture than covering only the portion protruding from electrode support cylinder 24 into the processing tank. An inner end of first electrode 30 is disposed inside processing tank 12. First electrode 30 is disposed on a wall surface side facing a wall surface of processing tank 12 on which discharge portion 17 is formed. Here, a length of insulator 53 and first electrode 30 protruding from electrode support cylinder 24 into the processing tank may be at least 0.5 mm. It is due to the following reason. When insulator 53 protrudes from electrode support cylinder 24 into the processing tank, slight disturbance occurs at a left end portion of gas phase G in FIG. 4 to be described later. A width of the disturbance is 0.5 mm. Therefore, at least 0.5 mm is necessary for insulator 53 to be sufficiently covered with gas phase G. Therefore, the protruding length is at least 0.5 mm.

Second electrode 31 is disposed in a vicinity of discharge portion 17. First electrode 30 is connected to power supply 60 and second electrode 31 is grounded. As an example, in FIG. 1, second electrode 31 is fixed to an outside of a wall surface of processing tank 12 on which discharge portion 17 is formed, specifically, on a wall surface of storage tank 90 adjacent to processing tank 12.

A pulse voltage of a high voltage by power supply 60 is applied to first electrode 30 and second electrode 31.

Liquid supplier 50 is, for example, a pump for supplying liquid (for example, water) L1 in processing tank 12. Liquid supplier 50 is connected to pipe 51. One end of pipe 51 is connected to introduction portion 15 and the other end of pipe 51 is connected to a liquid supply source (not illustrated) (for example, a water tank or a water supply). Alternatively, the other end of pipe 51 is connected to storage tank 90 and is connected to storage tank 90 in such a manner that stored water containing processing liquid L2 from liquid processing apparatus 1, that is, processed liquid L3 can be circulated (see circulation pipe 81 or the like indicated by an one-dotted chain line of FIG. 1).

Power supply 60 applies a pulse voltage of a positive or negative high voltage of several kV between first electrode 30 and second electrode 31. Power supply 60 can also apply a so-called bipolar pulse voltage that alternately applies a positive pulse voltage and a negative pulse voltage.

Apparatus Body

Figure 2:
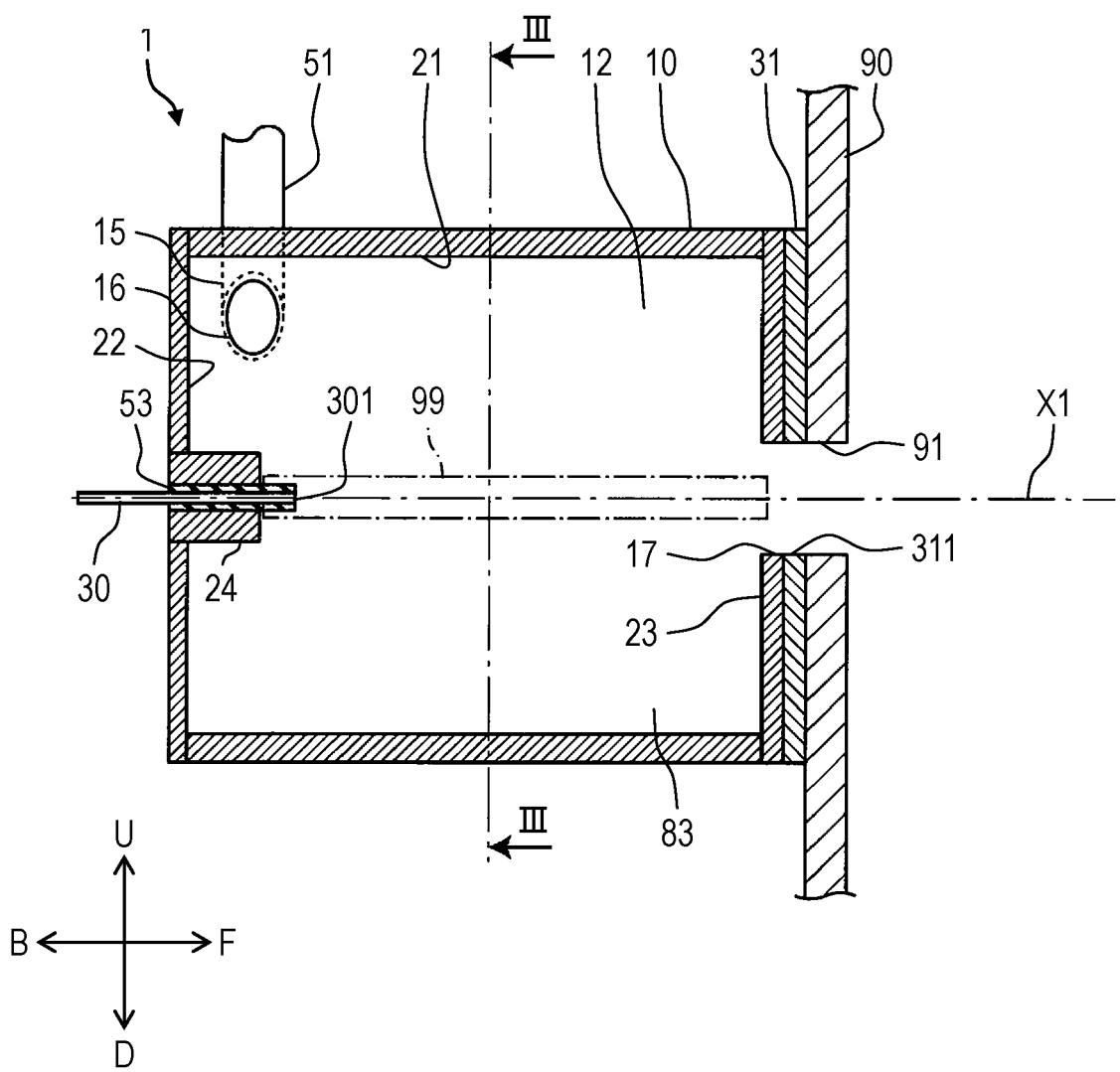
FIG. 2 is a side sectional view of an apparatus body according to Exemplary Embodiment 1.

Next, apparatus body 10 will be described in detail. FIG. 2 is a view illustrating a side sectional view of apparatus body 10.

Processing tank 12 includes first inner wall 21, second inner wall 22, and third inner wall 23. First inner wall 21 is a cylindrical wall portion. Second inner wall 22 is provided at a first end portion of first inner wall 21, for example, at a left end portion of FIG. 2. Third inner wall 23 is provided at a second end portion of first inner wall 21, for example, at a right end portion of FIG. 2. Second inner wall 22 and third inner wall 23 are substantially circular in side view. First inner wall 21, second inner wall 22, and third inner wall 23 constitute substantially cylindrical accommodation space 83 inside processing tank 12. A central axis of first inner wall 21, that is, a virtual central axis of substantially cylindrical accommodation space 83 constituted inside processing tank 12 is central axis X1.

Second inner wall 22 is provided with electrode support cylinder 24 inwardly protruded at a center. Electrode support cylinder 24 is tubular and extends on a third inner wall 23 side, that is, on a right side of FIG. 2. Electrode support cylinder 24 is disposed so that a central axis thereof coincides with central axis X1. First electrode 30 is supported inside electrode support cylinder 24 via insulator 53. First electrode 30 has a rod shape and insulator 53 is disposed in a cylindrical shape around first electrode 30. First electrode 30 is disposed so that a shaft in a longitudinal direction coincides with central axis X1. Respective inner end portions of first electrode 30 and insulator 53 are disposed so as to protrude from electrode support cylinder 24 toward the third inner wall 23 side, that is, the right side of FIG. 2. As an example of insulator 53, in addition to a resin material such as rubber or the like, enamel or the like can be used, and an insulator may be formed on an electrode surface by processing the electrode surface. If first electrode 30 can be supported by insulator 53 with respect to processing tank 12, electrode support cylinder 24 can be omitted.

Figure 3:
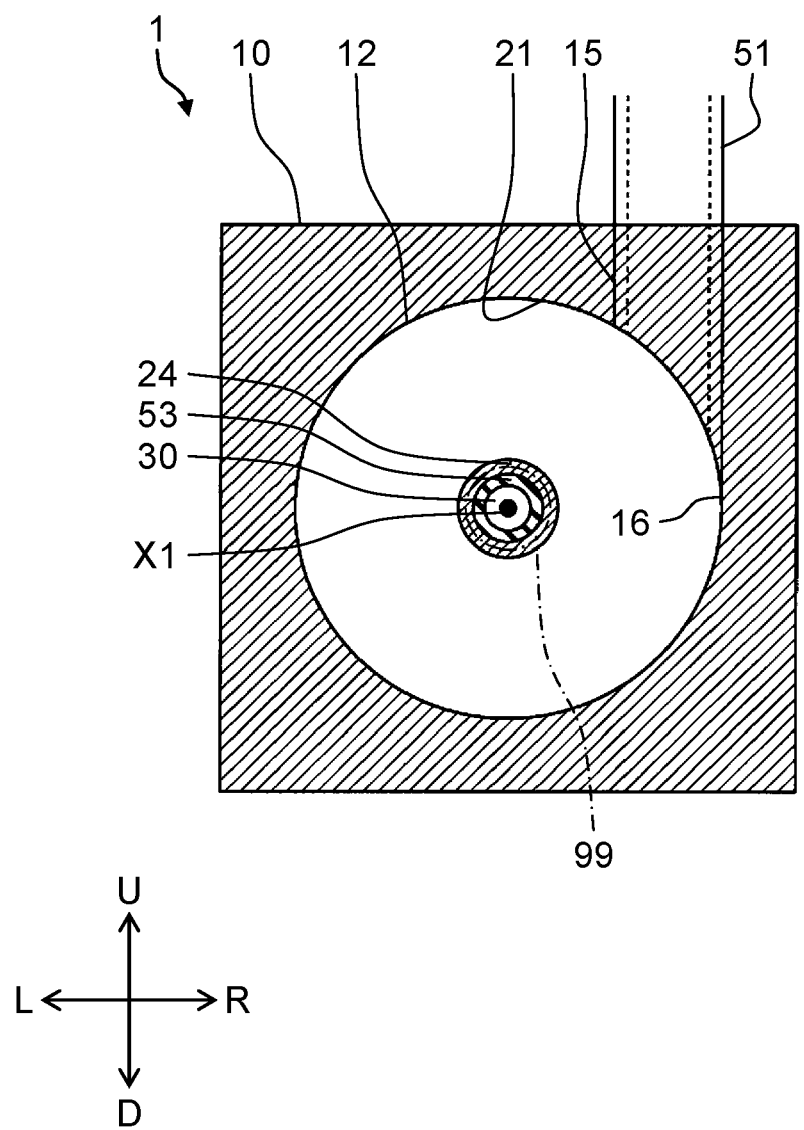
FIG. 3 is a sectional view which is taken along line III-III of FIG. 2.

Introduction portion 15 penetrates apparatus body 10. Opening end 16 on one side of introduction portion 15 is formed in first inner wall 21. Introduction portion 15 is disposed at a position adjacent to second inner wall 22 in side view. FIG. 3 is a sectional view which is taken along line III-III of FIG. 2. Introduction portion 15 is disposed on the wall surface of first inner wall 21.

Discharge portion 17 penetrates, for example, a center portion of third inner wall 23. Discharge portion 17 is formed such that a central axis thereof coincides with central axis X1.

Second electrode 31 is a plate-shaped metal member and has opening portion 311 penetrating a center portion thereof. Opening portion 311 has a circular shape and is formed such that a central axis thereof coincides with central axis X1.

Operation

Next, an operation of liquid processing apparatus 1 will be described.

Figure 4:
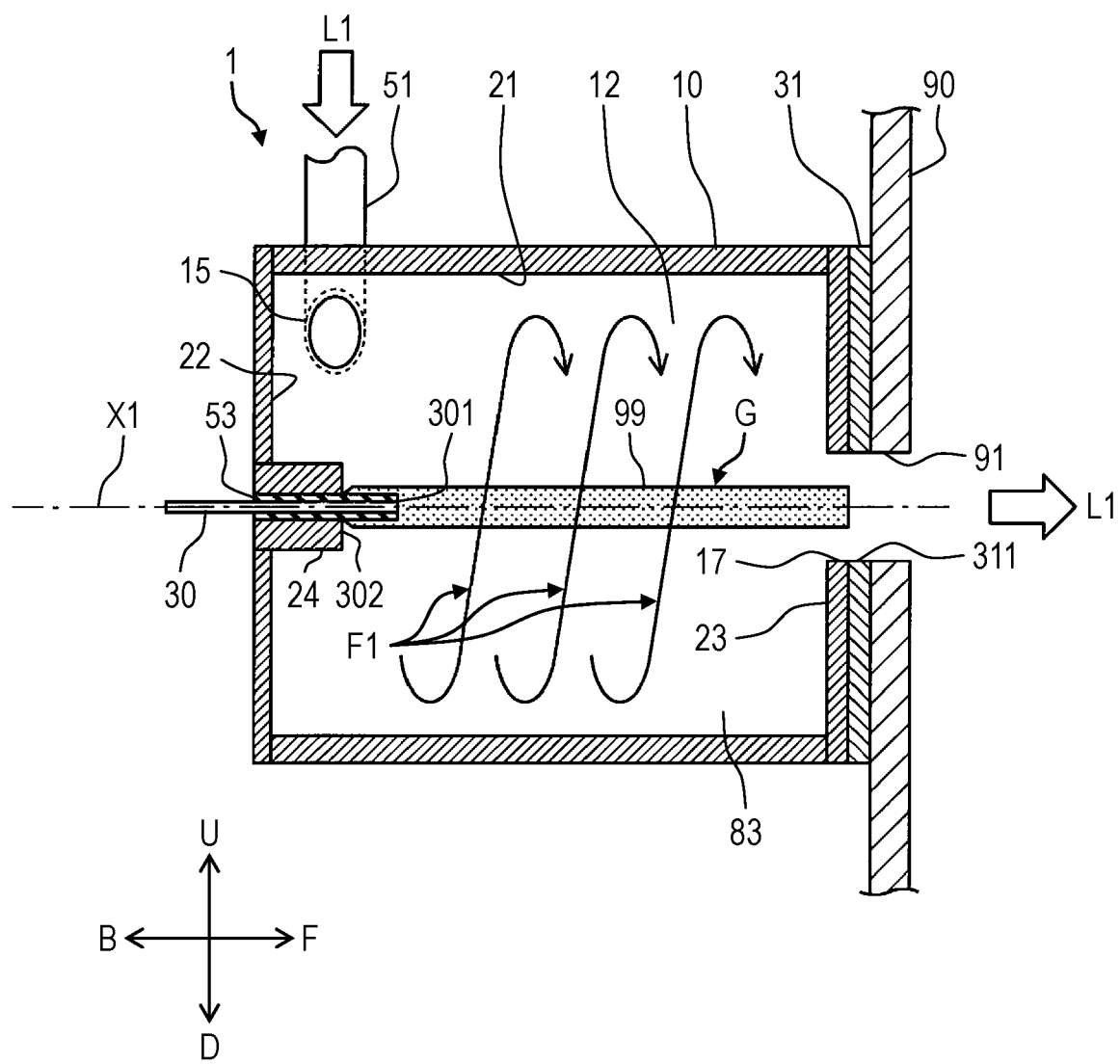
FIG. 4 is a side sectional view illustrating a state where a swirling flow is generated inside a processing tank and no voltage is applied in the liquid processing apparatus according to Exemplary Embodiment 1.

Hereinafter, for the sake of convenience of explanation, a state where gas phase G is generated inside processing tank 12 (FIG. 4) and a state where plasma P is generated by applying the pulse voltage from power supply 60 to gas phase G (FIG. 5) are separately described. FIG. 4 is a side sectional view illustrating a state where swirling flow F1 is generated inside processing tank 12 and no pulse voltage is applied.

First, as illustrated in FIG. 4, when liquid (for example, water) L1 is introduced from introduction portion 15 into processing tank 12 at a predetermined pressure, that is, a supply pressure of a pump, or a supply pressure of tap water in a case of tap water without a pump, liquid L1 moves from introduction portion 15 toward the right side of FIG. 4 while generating swirling flow F1 along first inner wall 21. Swirling flow F1 moving toward the right side of FIG. 4 while swirling moves toward discharge portion 17.

Due to swirling flow F1, a pressure in the vicinity of central axis X1 drops to a saturated water vapor pressure or less, a part of liquid L1 vaporizes, and gas phase G is generated in the vicinity of central axis X1 of first inner wall 21.

Figure 8A:
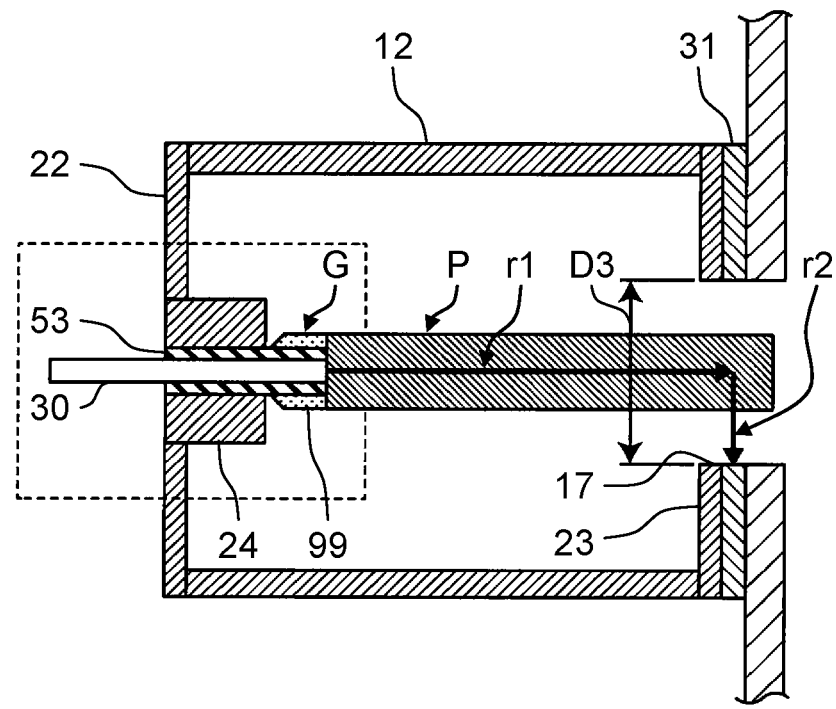
FIG. 8A is a view illustrating the current path and the state of plasma during discharge in the liquid processing apparatus according to Exemplary Embodiment 1.
Figure 8B:
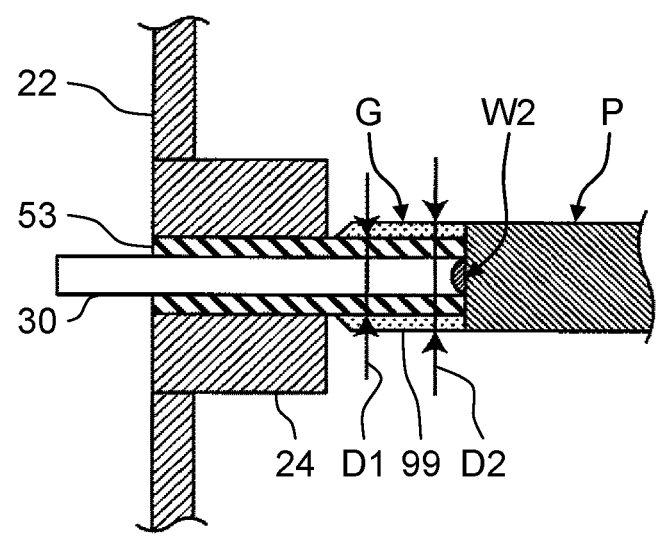
FIG. 8B is a view illustrating a state of wear of an electrode in the liquid processing apparatus of FIG. 8A.

Here, outer diameter D1 of insulator 53 is smaller than outer diameter D2 of gas phase G, in other words, outer diameter D2 of virtual gas-phase generating space 99 (see FIG. 2) (see FIG. 8B). With such a configuration, gas phase G can be generated from right end portion 302 of electrode support cylinder 24 to second electrode 31 along central axis X1 so as to envelop insulator 53. Here, gas-phase generating space 99 is a columnar space in which gas phase G is to be generated inside processing tank 12. A size (outer diameter) of gas-phase generating space 99 depends on an amount of protrusion of first electrode 30 from electrode support cylinder 24 into processing tank 12, a size of accommodation space 83 in processing tank 12, a size of an opening of introduction portion 15, and a supply pressure of liquid L1. As an example, the amount of protrusion of first electrode 30 from electrode support cylinder 24 into processing tank 12 is 0.5 mm, the distance from right end portion 301 of first electrode 30 to second electrode 31 is 15 mm, the diameter is 20 mm and the length in the axial direction is 20 mm as the size of accommodation space 83 in processing tank 12, the size of the opening of introduction portion 15 is 5 mm, the supply pressure of liquid L1, for example, water is 0.4 MPa or more and 0.5 MPa or less, and an amount of water is 3.5 L/min or more and 4.0 L/min or less.

Gas phase G receives a resistance of processing liquid L2 in storage tank 90 in the vicinity of a swirl center, specifically, in the vicinity of discharge portion 17 of FIG. 4 coinciding with central axis X1, thereby being sheared into micro bubbles or ultra-fine bubbles (nano-bubbles) and being diffused from discharge portion 17 to storage tank 90 via intake 91 connected to discharge portion 17.

Figure 5:
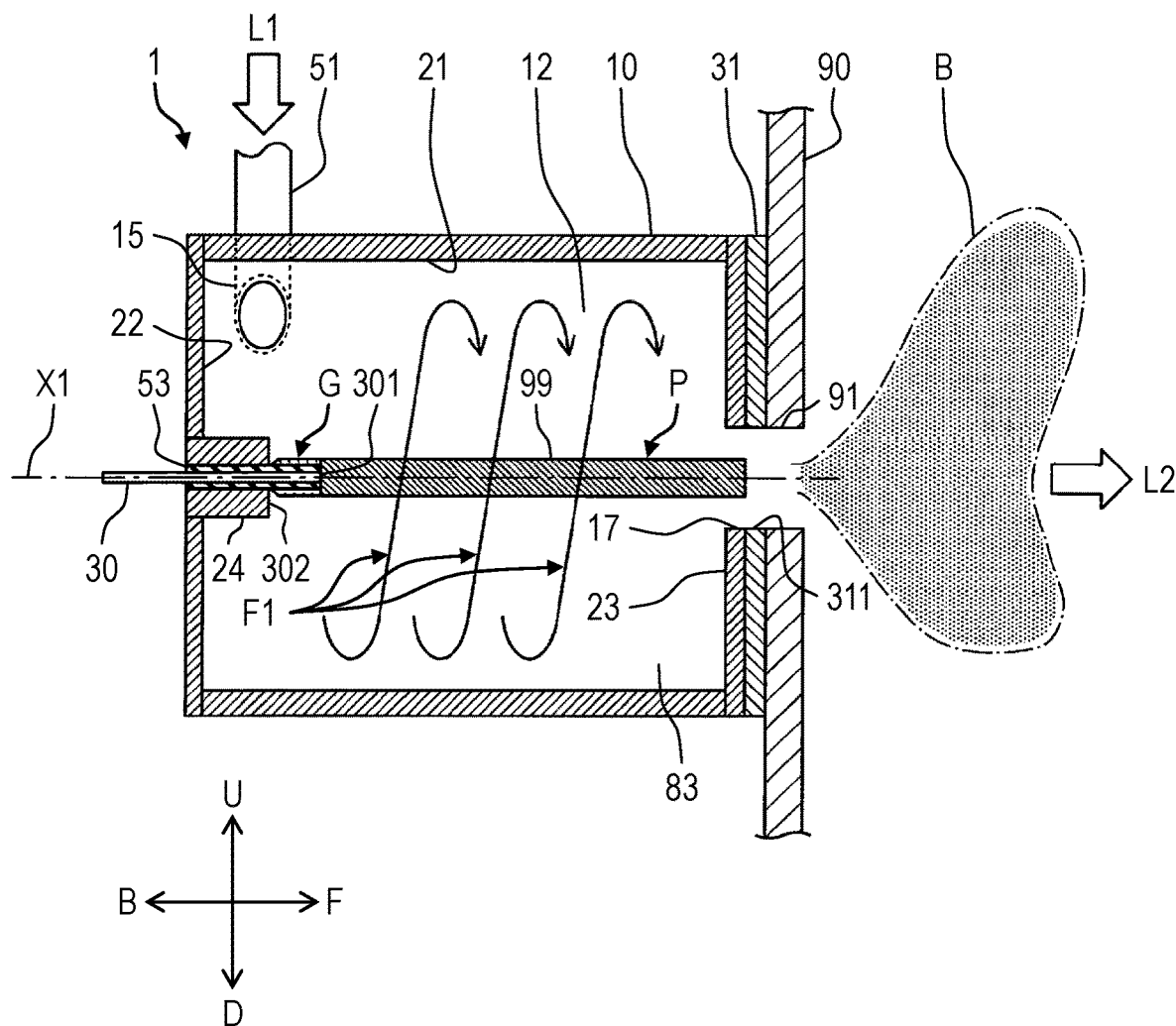
FIG. 5 is a side sectional view illustrating a state where the swirling flow is generated in the processing tank and a voltage is applied in the liquid processing apparatus according to Exemplary Embodiment 1.

FIG. 5 is a side sectional view illustrating a state where swirling flow F1 is generated inside processing tank 12 and a pulse voltage is applied between first electrode 30 and second electrode 31 from power supply 60 following the state of FIG. 4. As illustrated in FIG. 5, in a state where gas phase G which is obtained by vaporizing liquid L1 is generated from first electrode 30 to the vicinity of second electrode 31, the pulse voltage of a high voltage is applied by power supply 60 between first electrode 30 and second electrode 31. When the pulse voltage of the high voltage is applied between first electrode 30 and second electrode 31, in gas phase G, plasma P is generated from right end portion 301 of first electrode 30 to second electrode 31, thereby generating radicals (OH radicals or the like) or ions. The radicals or ions are dissolved from gas phase G to the swirling flow F1 side to decompose the contaminants dissolved in liquid L1. In addition, plasma P in gas phase G in the vicinity of discharge portion 17 receives the resistance of processing liquid L2 in storage tank 90, thereby generating a large amount of bubbles B containing OH radicals or the like. In this manner, processing liquid L2 which is processed by the OH radicals or the like generated by plasma P and in a state of including bubbles B containing the OH radicals or the like is discharged from discharge portion 17 toward storage tank 90. That is, the OH radicals or the like generated by plasma P dissolves in processing liquid L2 in storage tank 90 directly or from within bubbles B. When a certain period of time has elapsed, processing liquid L2 in storage tank 90 is transformed into relatively stable hydrogen peroxide. Plasma P generated by applying the pulse voltage of the high voltage disappears when the application of the voltage is stopped.

When plasma discharge is generated, the ultraviolet light is generated at the same time. When contaminants or bacteria is irradiated with the generated ultraviolet light, it is possible to exert the decomposing and sterilizing action. Hydrogen peroxide water generated in the processing liquid is irradiated with the ultraviolet light, so that, as described above, the OH radicals or the like is generated and thereby the decomposing and sterilizing action is exerted.

Next, an effect of suppressing wear of an electrode in liquid processing apparatus 1 according to the exemplary embodiment, of the disclosure will be described using a current path and a generation state of plasma during discharge.

Figure 6A:
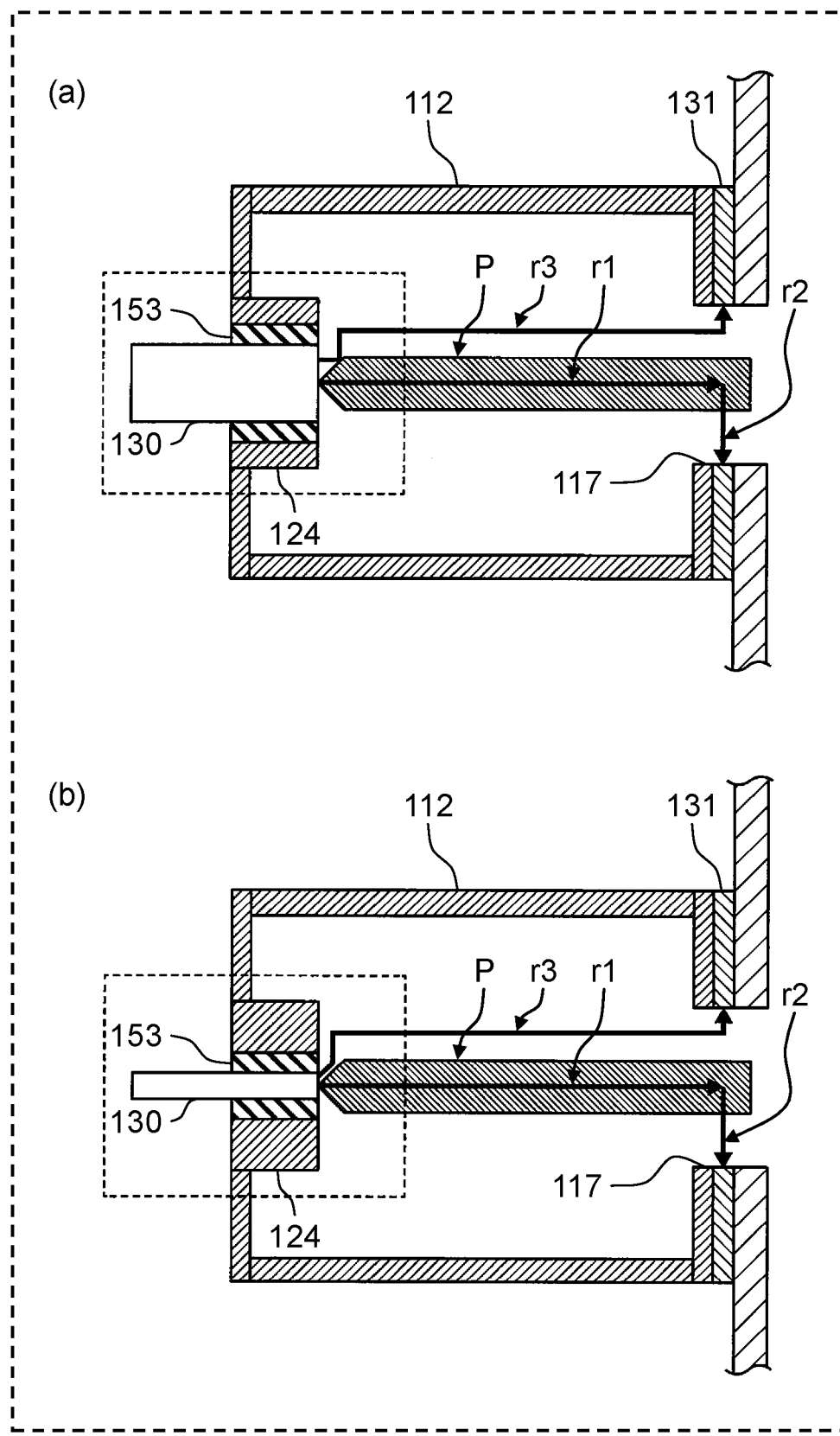
FIG. 6A is a view illustrating a current path and a state of plasma during discharge in a case where positions of a right end of an electrode support cylinder and a right end of the first electrode are coincident with each other in the liquid processing apparatus of the related art.

FIG. 6A illustrates the current path and the state of plasma P during discharge in a case where positions of a right end of electrode support cylinder 124, a right end of insulator 153, and a right end of first electrode 130 are coincident with each other in the liquid processing apparatus of the related art. A case where an outer diameter of first electrode 130 is larger than an outer diameter of plasma P is illustrated in (a) of FIG. 6A and a case where the outer diameter of first electrode 130 is smaller than the outer diameter of plasma P is illustrated in (b) of FIG. 6A. In (a) of FIG. 6A, plasma P comes into point-contact with a right end portion of first electrode 130, spreads in a conical shape, and formed up to the vicinity of second electrode 131. Therefore, as current discharge paths during discharge, there are current path r2 through which a current flows from first electrode 130 up to second electrode 131 through path r1 through which the current flows up to the vicinity of second electrode 131 through plasma P and path r3 through which a current flows from first electrode 130 to second electrode 131 through the liquid without passing through plasma P. As illustrated in (b) of FIG. 6A, this is the same also in a case where the outer diameter of first electrode 130 is smaller than the outer diameter of plasma P, path r3 through which the current flows to second electrode 131 through the liquid without passing through plasma P necessarily exists. When a voltage is applied to first electrode 130 and second electrode 131, electrolysis occurs due to path r3. Reference numeral 153 is an insulator between first electrode 130 and processing tank 112. Reference numeral 117 is a discharge portion.

Figure 6B:
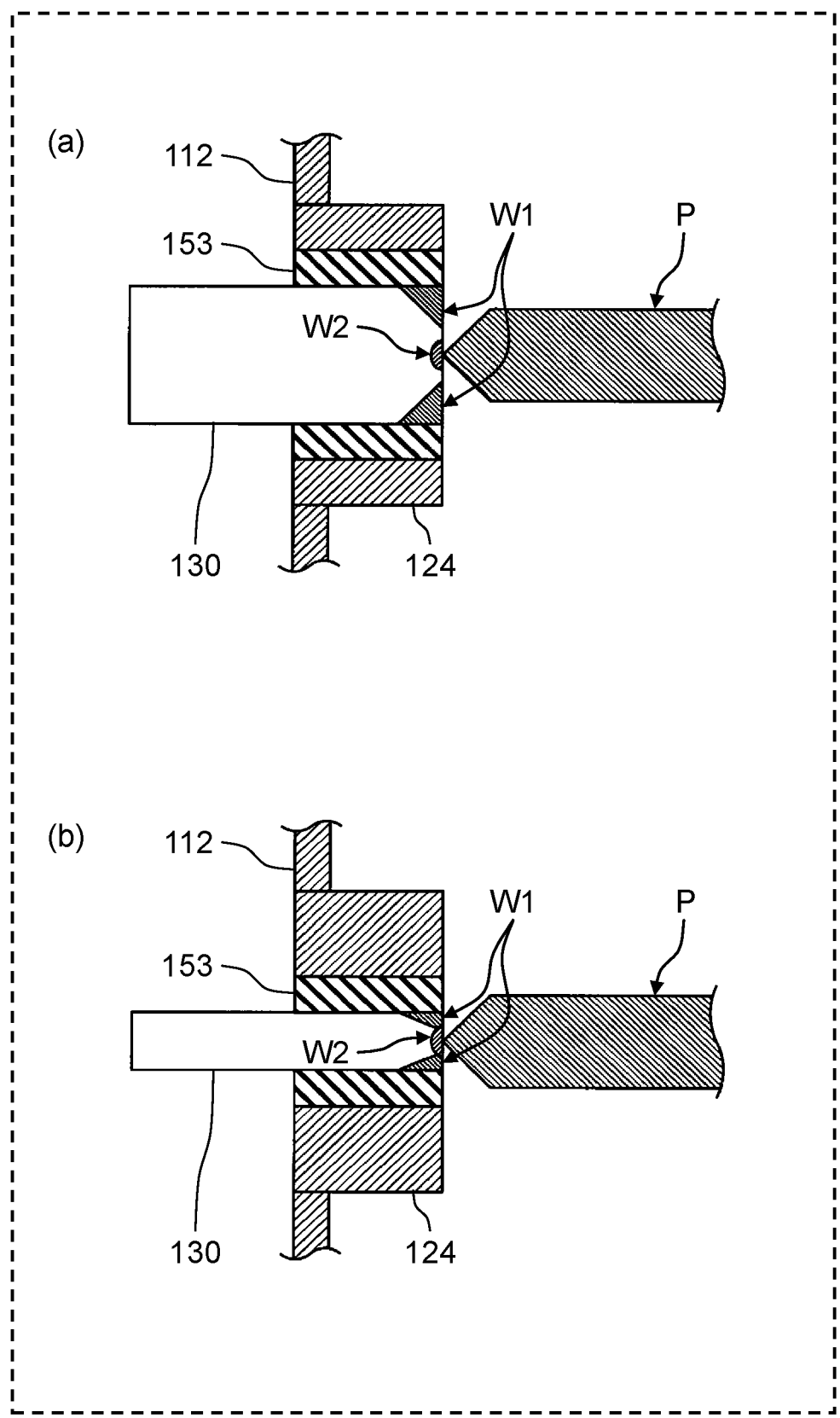
FIG. 6B is a view illustrating a state of wear of an electrode in the liquid processing apparatus of FIG. 6A.

FIG. 6B is an enlarged view of a dotted line portion of FIG. 6A and illustrates a state of wear of an electrode in a case where the liquid processing is performed in the apparatus of FIG. 6A. Also in both cases of (a) and (b) of FIG. 6B, wear W1 due to electrolysis and wear W2 due to plasma discharge occur. It is known that wear W1 due to the electrolysis occurs remarkably in the vicinity of the right end portion of first electrode 130 where the electric field is concentrated and a wear amount thereof is larger than that of wear W2 depending on an application condition of the voltage.

Figure 7A:
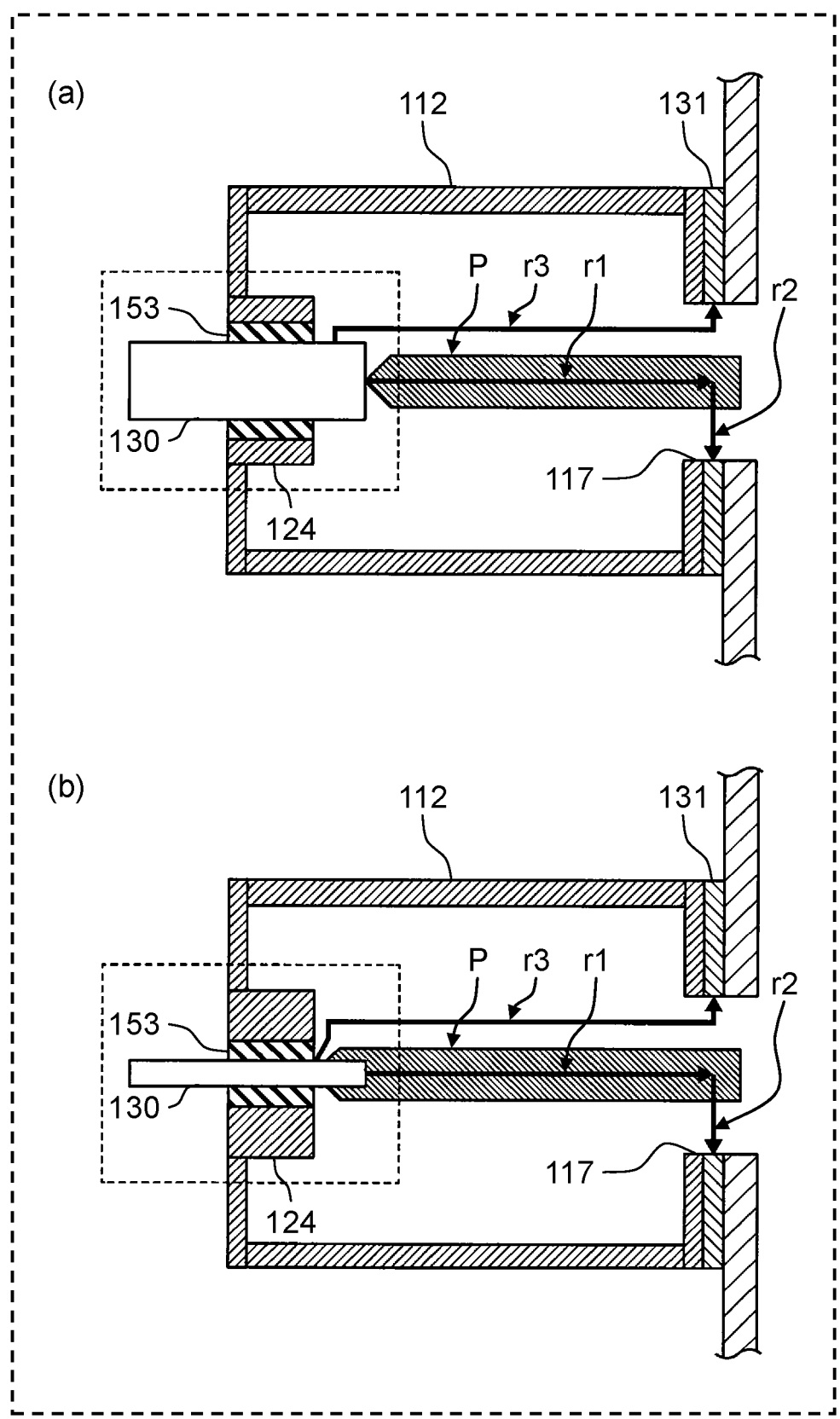
FIG. 7A is a view illustrating the current path and the state of plasma during discharge in a case where the first electrode projects from the right end of the electrode support cylinder in the liquid processing apparatus of the related art.

FIG. 7A illustrates the current path and the state of plasma P during discharge in a case where first electrode 130 projects inwardly from the right end of electrode support cylinder 124 in the liquid processing apparatus of the related art. That is, FIG. 7A illustrates a state where the positions of the right end of electrode support cylinder 124 and the right end of insulator 153 coincide with each other, but the position of the right end of first electrode 130 protrudes from the positions thereof. In a case where the outer diameter of first electrode 130 of (a) of FIG. 7A is larger than the outer diameter of plasma P, most of first electrode 130 projected from electrode support cylinder 124 comes into contact with liquid.

Figure 7B:
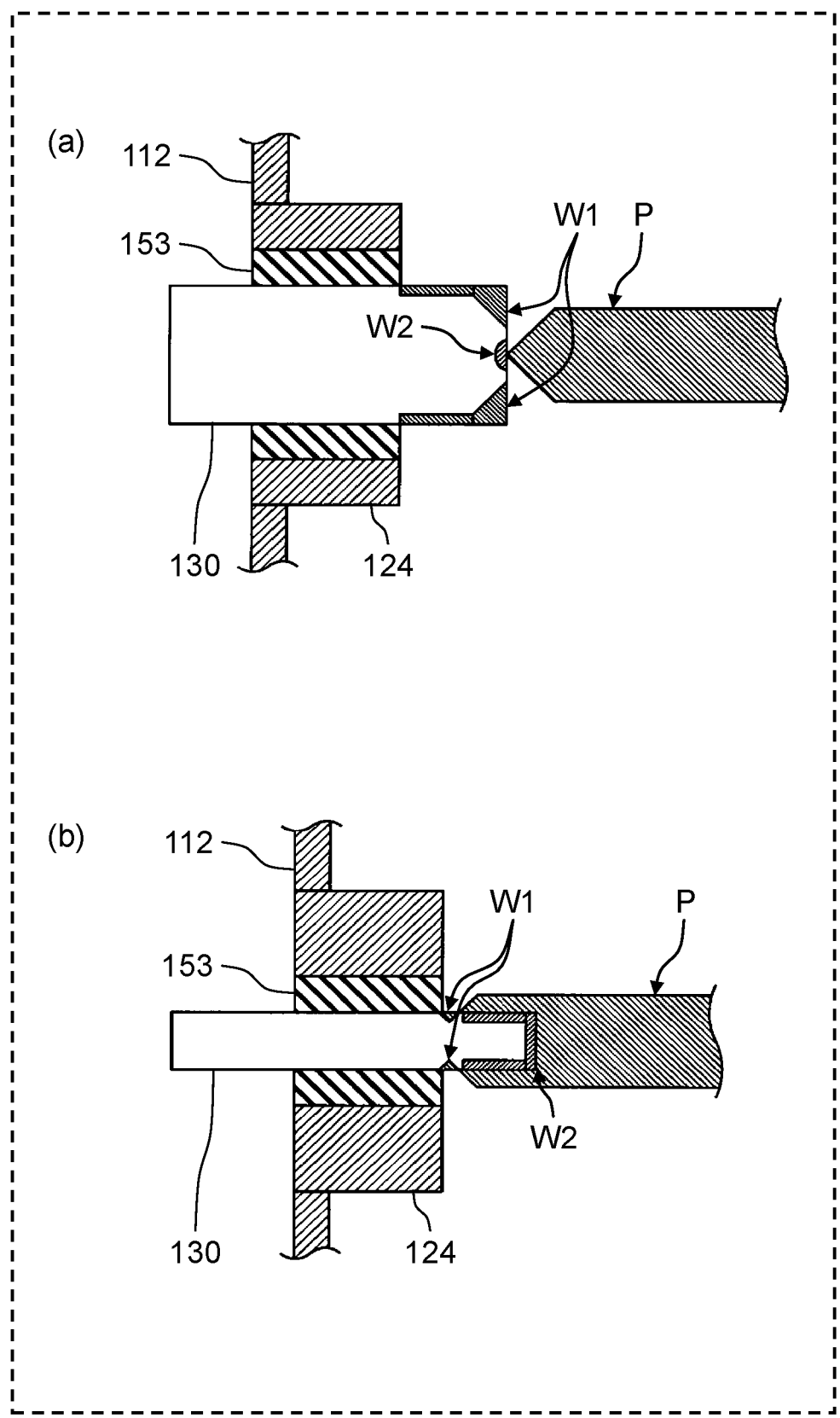
FIG. 7B is a view illustrating a state of the wear of the electrode in the liquid processing apparatus of FIG. 7A.

In a case where the outer diameter of first electrode 130 of (b) of FIG. 7A is smaller than the outer diameter of plasma P, first electrode 130 is covered with plasma P, but first electrode 130 comes into contact with the liquid at a portion of the right end portion of electrode support cylinder 124, where the outer diameter of plasma P decreases. Therefore, in either case, there is path r3 through which a current flows from first electrode 130 to second electrode 131 through the liquid and without passing through plasma P. FIG. 7B is an enlarged view of a dotted line portion of FIG. 7A and illustrates a state of wear of first electrode 130 in a case where the liquid processing is performed in the apparatus of FIG. 7A. Also in both cases of (a) and (b) of FIG. 7B, wear W1 due to electrolysis and wear W2 due to plasma discharge occur. In (b) of FIG. 7B, since first electrode 130 is covered with plasma P, wear W2 due to the plasma discharge occurs over an entire exposed portion of first electrode 130, but a current due to the plasma discharge is averaged over the entire exposed portion of first electrode 130. Therefore, a local temperature rise of first electrode 130 due to the concentration of the current at one place of first electrode 130 is suppressed and the temperature rise is averaged, so that an amount of wear is smaller than that of (b) of FIG. 6B.

FIG. 8A illustrates the current path and the state of plasma P during discharge in liquid processing apparatus 1 according to Exemplary Embodiment 1. In FIG. 8A, positions of the right end of insulator 53 and the right end of first electrode 30 coincide with each other, and the positions protrude inwardly, that is, to the third inner wall 23 side from the right end of electrode support cylinder 24. In FIG. 8A, a protruded portion of first electrode 30, which is protruded and exposed from electrode support cylinder 24 into processing tank 12, and is covered with insulator 53, is covered with gas phase G. Since the right end portion of insulator 53 protrudes from the right end portion of electrode support cylinder 24 to the inside, that is, to the third inner wall 23 side, also in the place where gas phase G of the right end portion of electrode support cylinder 24 is narrowed, insulation is maintained with respect to first electrode 30. In FIG. 8A, plasma P is generated on the right side of the right end portion of first electrode 30. Since there is no place where first electrode 30 comes into contact with liquid L1, there is no path through which the current flows to second electrode 31 through liquid L1 and it is possible to suppress the wear of the electrode due to the electrolysis. As illustrated in FIG. 8B, since only wear W2 of the electrode due to the plasma discharge occurs, it is possible to suppress the wear of the electrode as compared with the liquid processing apparatus of the related art. That is, even in a case where the facility is operated for a long time, plasma P is stabilized and it is possible to process liquid L1 efficiently.

In Exemplary Embodiment 1, it is important that outer diameter D1 of insulator 53 is smaller than outer diameter D2 of gas phase G. A thickness, that is, outer diameter D2 of gas phase G depends on the size, that is, diameter D3 of opening portion 311 provided at the center portion of second electrode 31. FIG. 9 illustrates the thickness, that is, outer diameter D2 of gas phase G in a case where diameter D3 of opening portion 311 is changed. It is known that a ratio of outer diameter D2 of gas phase G to diameter D3 of opening portion 311 is 30% to 34%, which is outer diameter D2 of substantially 30% of diameter D3 of opening portion 311. It is necessary to constitute outer diameter D1 of insulator 53 to be smaller than outer diameter D2 of gas phase G, and it is known that an insulation property is improved as outer diameter D1 of insulator 53 decreases. It is confirmed that if outer diameter D1 is reduced at least by 0.1 mm from outer diameter D2 of gas phase G, the insulation property is improved. On the other hand, if outer diameter D1 of insulator 53 is too small, rigidity of insulator 53 becomes weak and insulator 53 cannot be fixed along central axis X1. In order to fix insulator 53 along central axis X1, it is necessary to have outer diameter D1 of 0.1 mm or more. Therefore, it is preferable that outer diameter D1 of insulator 53 is 0.1 mm or more, and is larger than 0% and 30% or less of diameter D3 of opening portion 311.

According to Exemplary Embodiment 1 described above, the side surface of first electrode 30 is covered with insulator 53 and outer diameter D1 of insulator 53 is smaller than outer diameter D2 of gas phase G. According to such a configuration, it is possible to suppress a leakage current flowing from first electrode 30 toward second electrode 31 only through liquid L1 without passing through plasma P, suppress the wear of the electrode of first electrode 30 due to the electrolysis, and stably generate plasma P for a long time.

Figure 10:
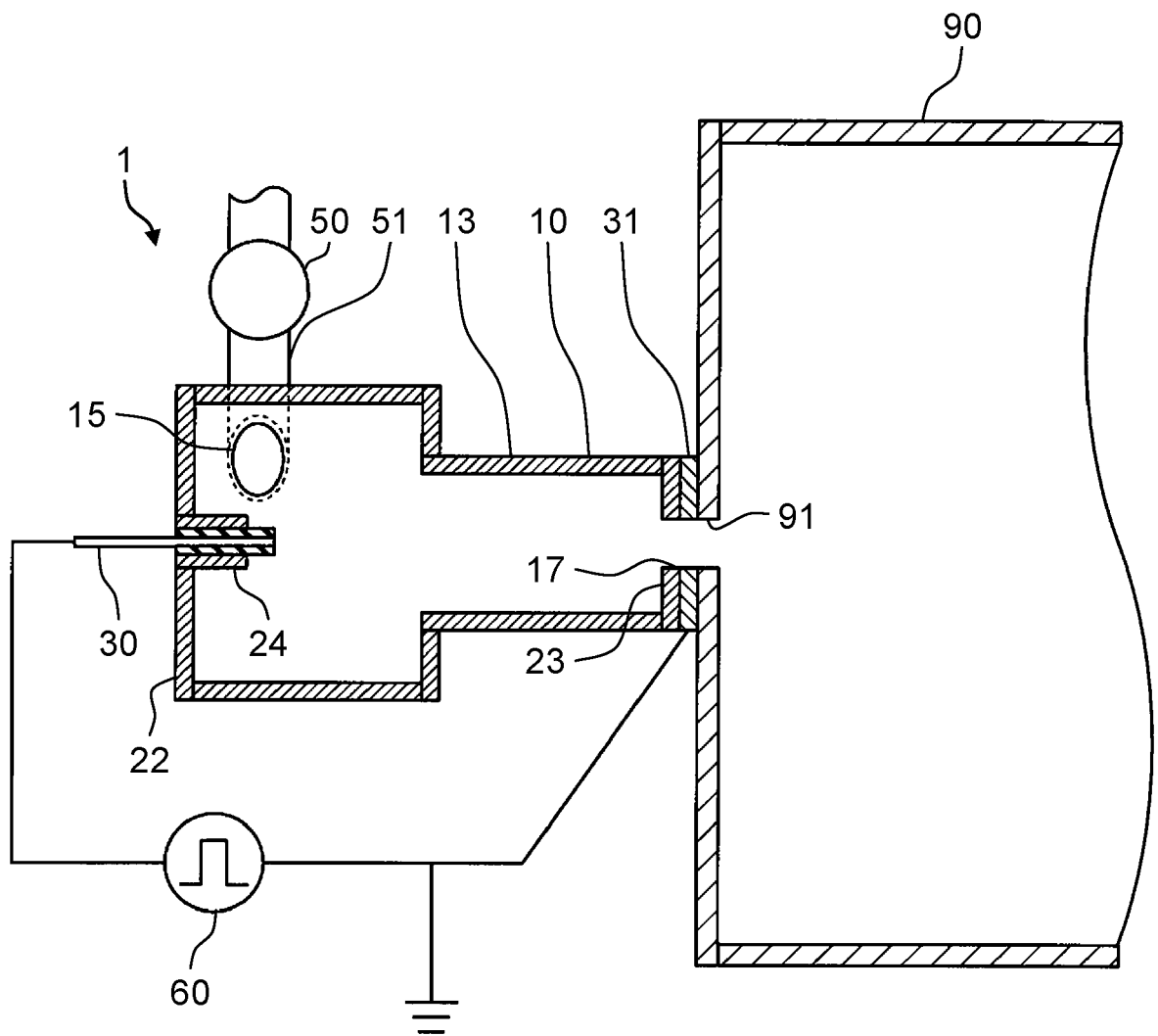
FIG. 10 is a view illustrating a processing tank in which cylinders having different radii are combined in the liquid processing apparatus according to Exemplary Embodiment 1.
Figure 11:
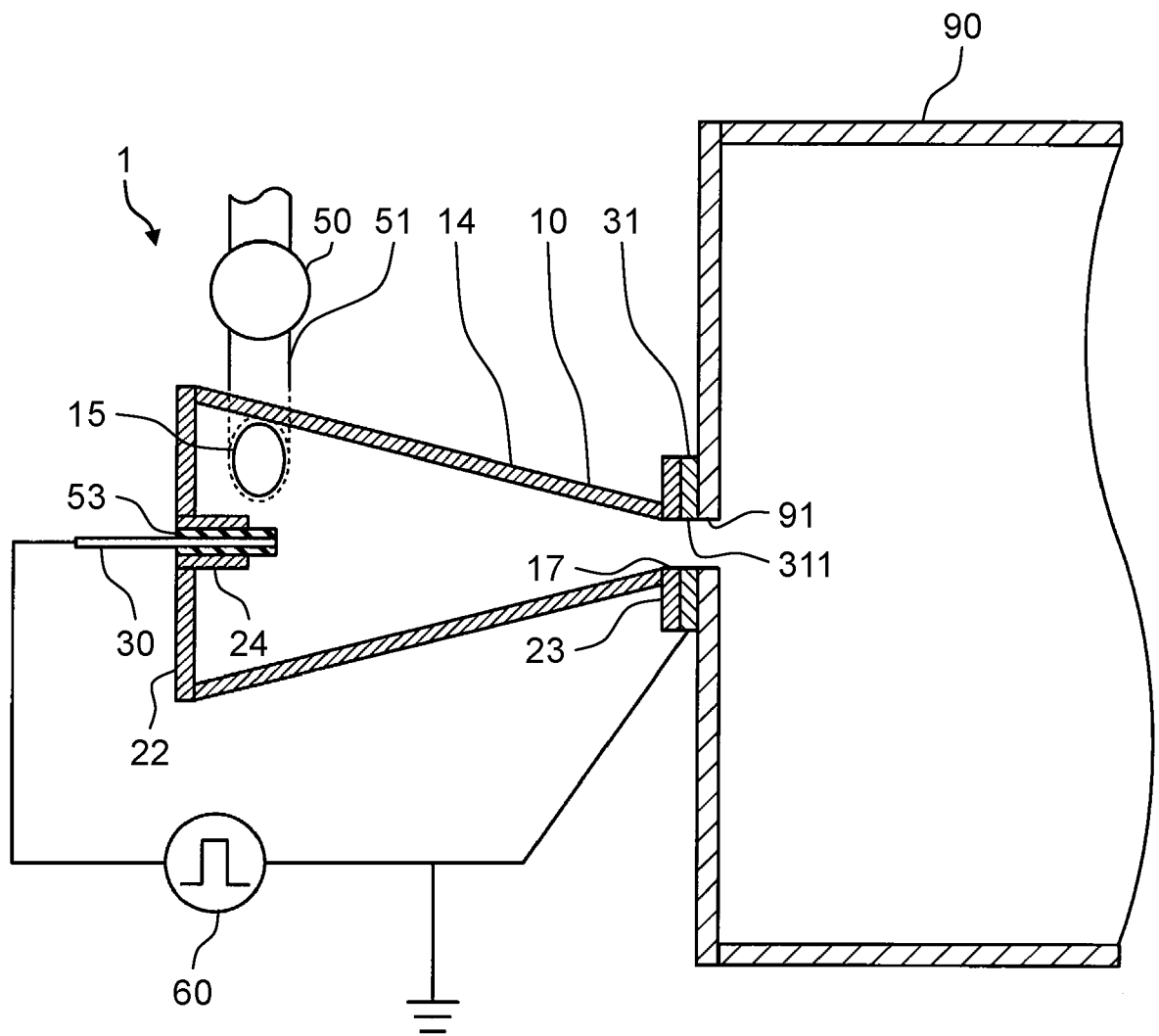
FIG. 11 is a view illustrating a conical processing tank in the liquid processing apparatus according to Exemplary Embodiment 1.
Figure 11:
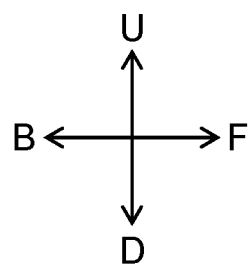

Although processing tank 12 has a simple cylindrical shape, it is possible to adopt various shapes as long as it is a cylindrical processing tank having one closed end portion having a circular cross-sectional section. For example, even in processing tank 13 in which cylinders having different radii are combined as illustrated in FIG. 10, and processing tank 14 having a conical shape illustrated in FIG. 11, the same effect as that of Exemplary Embodiment 1 can be obtained.

Exemplary Embodiment 2

In Exemplary Embodiment 1, the right end portion of first electrode 30 and the right end portion of insulator 53 coincide with each other. However, first electrode 30 protrudes to the right side from the right end portion of insulator 53, so that it is possible to further reduce the wear of first electrode 30.

Figure 12:
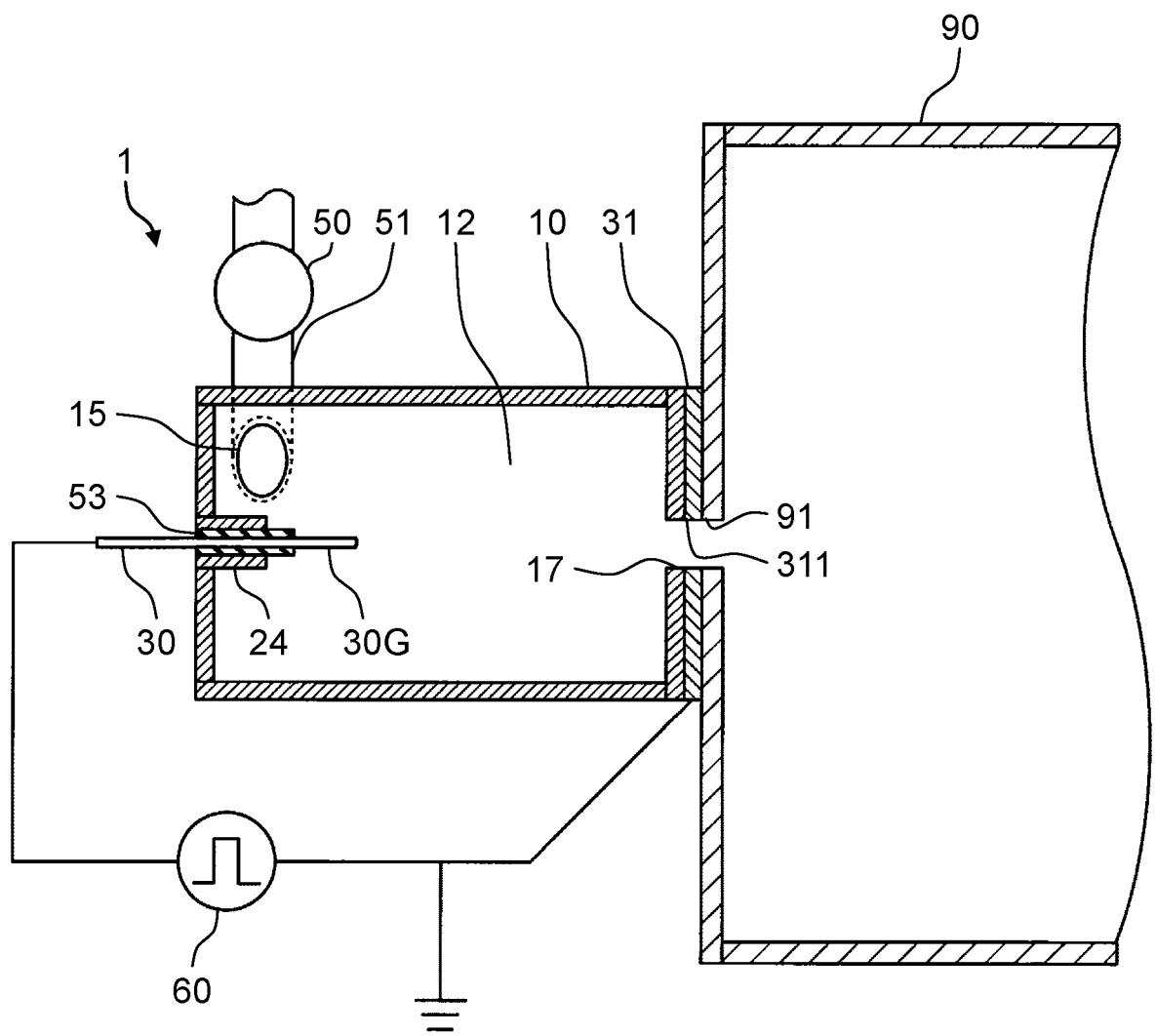
FIG. 12 is a side sectional view illustrating a configuration of a liquid processing apparatus according to Exemplary Embodiment 2.
Figure 12:
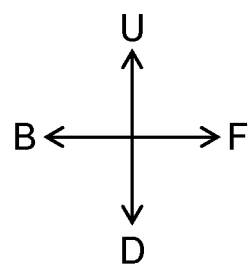
Figure 13A:
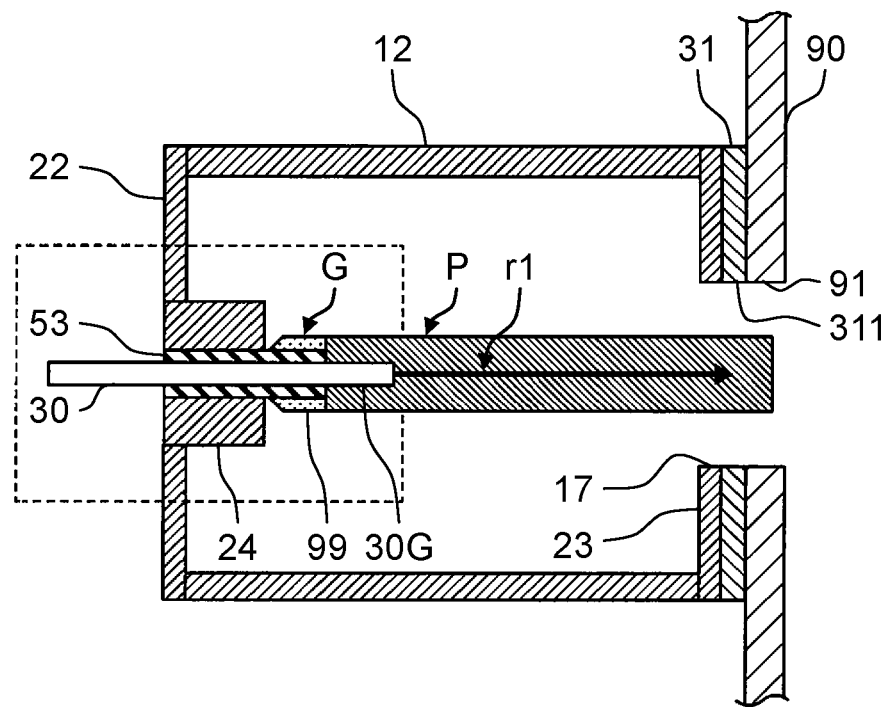
FIG. 13A is a view illustrating a current path and a state of plasma during discharge in the liquid processing apparatus according to Exemplary Embodiment 2.
Figure 13B:
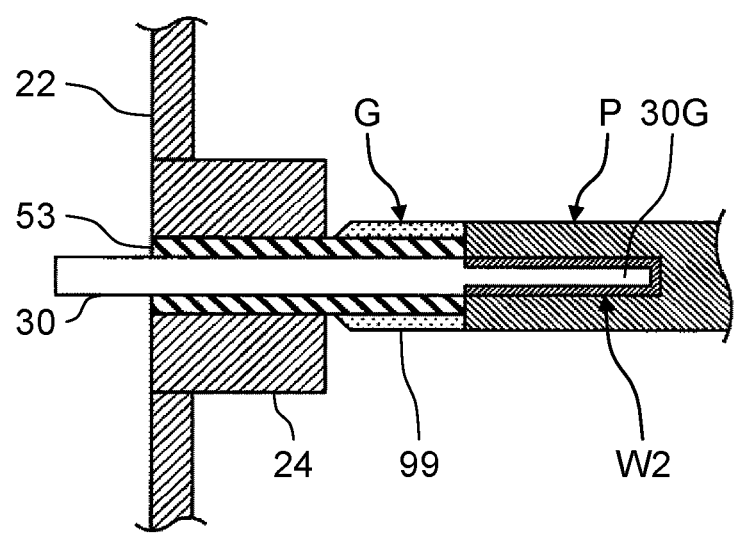
FIG. 13B is a view illustrating a state of wear of an electrode in the liquid processing apparatus of FIG. 13A.
Figure 14:
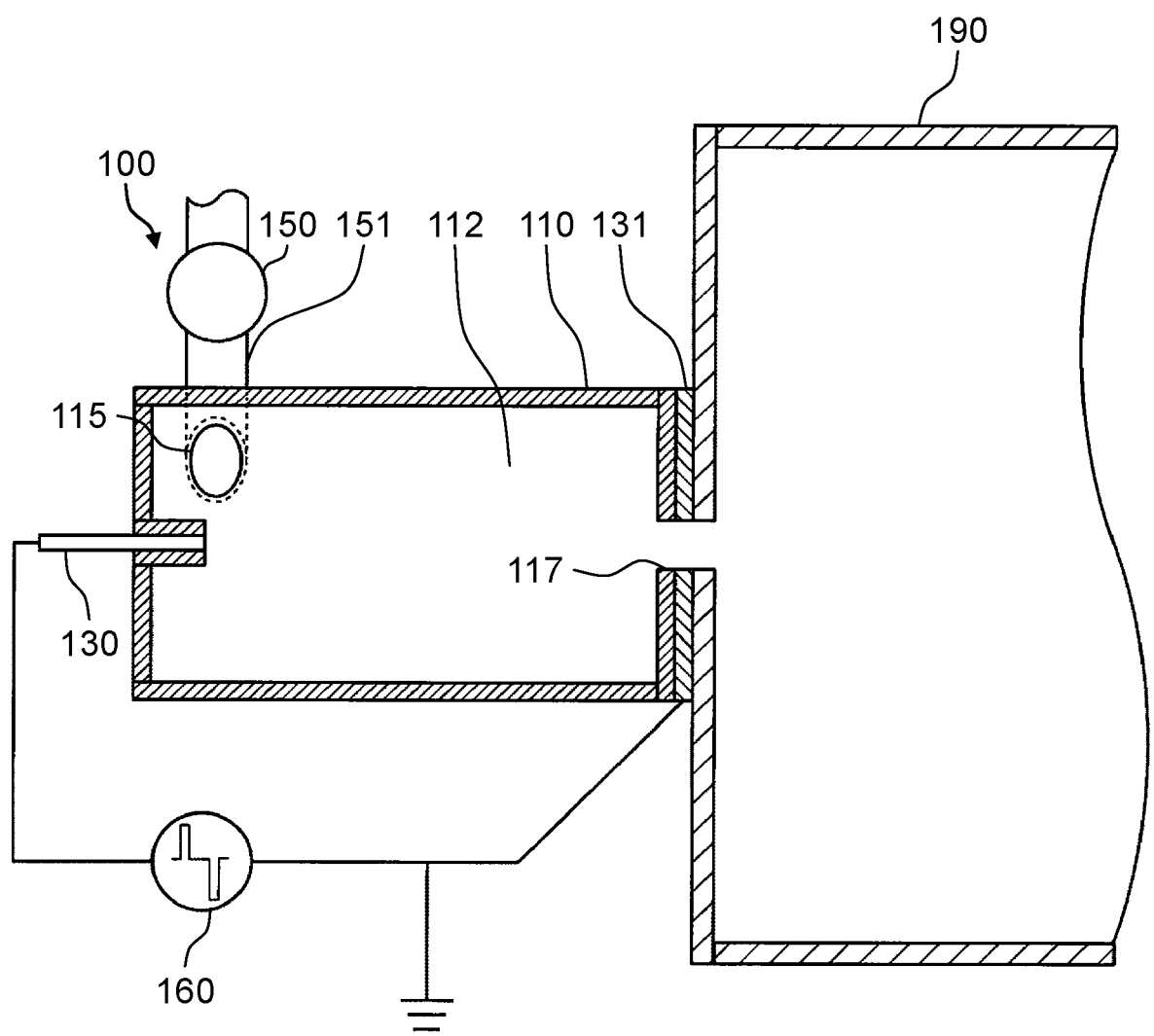
FIG. 14 is a sectional view of a liquid processing apparatus of the related art.
Figure 14:
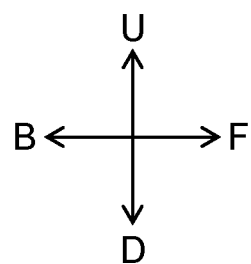
Figure 15:
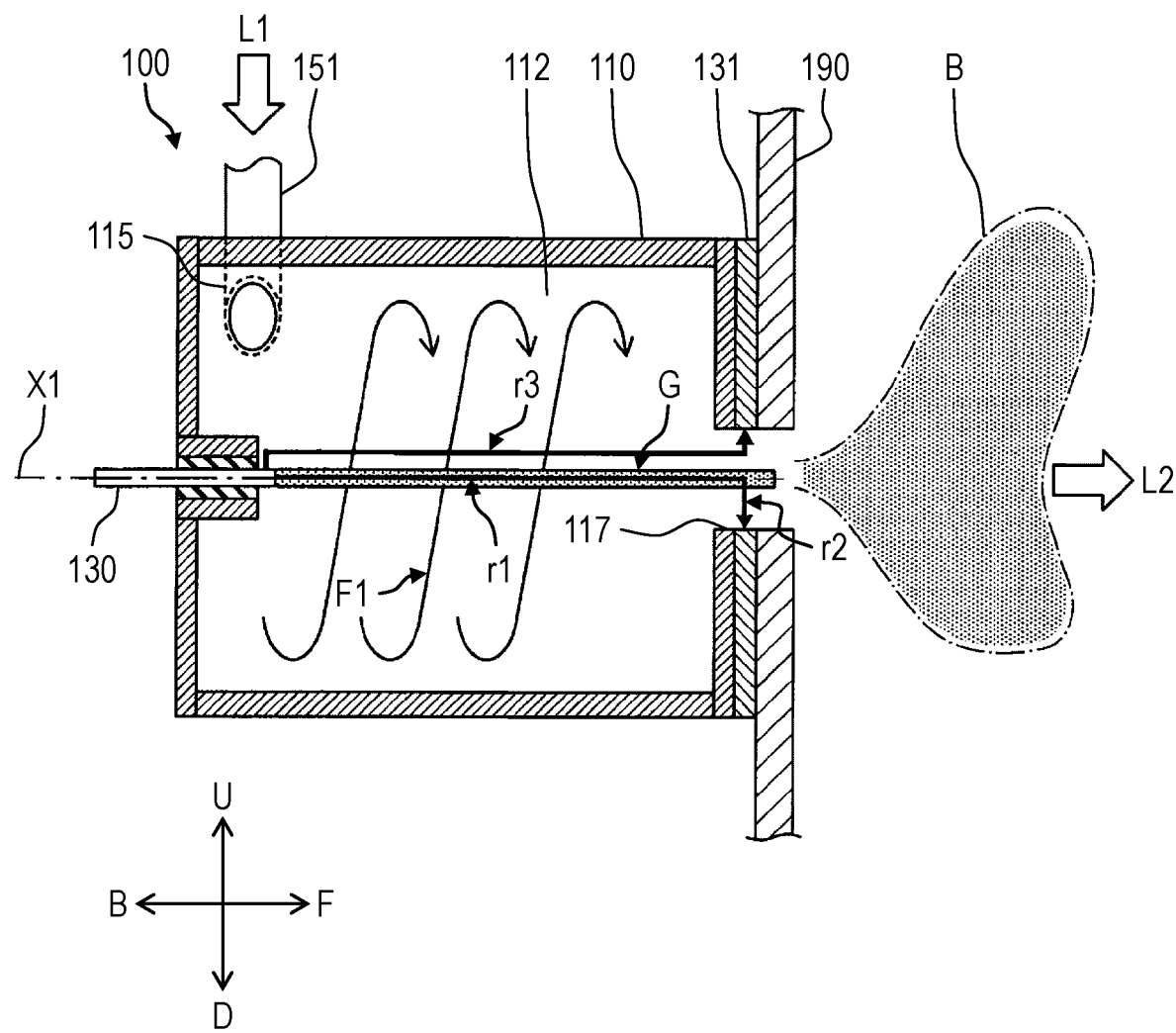
FIG. 15 is a side sectional view illustrating a state where a swirling flow is generated inside a processing tank and a voltage is applied in the liquid processing apparatus of the related art.

FIG. 12 illustrates a configuration of an apparatus of Exemplary Embodiment 2 of the disclosure. Exemplary Embodiment 2 is different from Exemplary Embodiment 1 in that an inner end portion of first electrode 30 protrudes to the right side from the right end portion of insulator 53. FIG. 13A illustrates a current path and a state of plasma P during discharge of Exemplary Embodiment 2 of the disclosure. Since the inner end portion of first electrode 30 is covered with plasma P, the plasma discharge is generated on an entire surface of exposed portion 30G that is the inner end portion of first electrode 30. FIG. 13B is an enlarged view of a dotted line portion of FIG. 13A and illustrates a state of wear of an electrode in a case where the liquid processing is performed in the liquid processing apparatus of FIG. 13A. Since the plasma discharge is generated on an entire surface of exposed portion 30G of first electrode 30, a current is averaged on the entire surface of exposed portion 30G of first electrode 30, a local temperature rise of a part of first electrode 30 due to the concentration of the current at one place of first electrode 30 is suppressed and the temperature rise is averaged. Therefore, wear W2 due to the plasma discharge occurs on the entire surface of exposed portion 30G of first electrode 30 and an amount of wear is further reduced.

As an amount of protrusion of the inner end portion of first electrode 30 protruding to the right side from the right end portion of insulator 53 increases, a wear prevention effect increases. A maximum value of exposed portion 30G is a position up to 0.5 mm before discharge portion 17. A minimum value of the amount of protrusion is 0.5 mm. This is for the same reason as that of the protruding length of insulator 53. That is, when the inner end portion protrudes from insulator 53 into the processing tank, slight disturbance occurs at the left end portion of gas phase G in FIG. 13A. A width of the disturbance is 0.5 mm. Therefore, at least 0.5 mm is required for sufficiently covering the protruding portion of the inner end portion with gas phase G. Therefore, the amount of protrusion is at least 0.5 mm.

According to Exemplary Embodiment 2 described above, since the plasma discharge is generated on the entire surface of exposed portion 30G of first electrode 30, the amount of wear of first electrode 30 further decreases. Therefore, it is possible to stably generate plasma P for a long time.

Although the exemplary embodiments of the present disclosure are described above, the above-described exemplary embodiments are merely examples for implementing the present disclosure. Therefore, the present disclosure is not limited to the above-described exemplary embodiments, and the above-described exemplary embodiments can be appropriately modified and implemented without departing from the spirit of the disclosure. Specifically, arbitrary exemplary embodiments or modifications of the above-described various exemplary embodiments or modifications are suitably combined, so that it is possible to achieve the respective effects possessed by them. In addition, combinations of the exemplary embodiments, combinations of the examples, or combinations of the exemplary embodiments and the examples are possible, and combinations of features in different exemplary embodiments or examples are also possible.

In the liquid processing apparatus of the present disclosure, the outer diameter of the insulator covering the side surface of the portion protruding from the wall on the one end side of the processing tank of the first electrode into the processing tank is smaller than the outer diameter of the gas-phase generating space for generating gas phase in the processing tank. With such a configuration, the leakage current flowing only through the liquid without passing through the plasma is reduced, so that it is possible to suppress the wear of the electrode due to the electrolysis occurring at the portion where the first electrode comes into contact with the liquid, and to reduce the wear of the electrode. Therefore, even when the facility is operated for a long time, plasma can be stabilized and liquid can be processed efficiently.

The liquid processing apparatus of the present disclosure is capable of causing the decomposing and sterilizing action caused by the direct contact of contaminants or bacteria contained in the liquid with plasma by generating the plasma in the liquid, and the decomposing and sterilizing action by the ultraviolet light, radicals, or the like caused by the plasma discharge at the same time. Therefore, it is possible to process the liquid, and to use the liquid processing apparatus for sterilization, deodorization, various environmental improvement, or the like.

What is claimed is:

1. A liquid processing apparatus comprising:
a cylindrical processing tank of which a first end is closed;
a rod-shaped first electrode that is disposed at the first end of the processing tank;
an insulator that covers at least a part of a side surface of the first electrode disposed to protrude from an inner wall of the first end of the processing tank into the processing tank;
a liquid introduction port that causes a liquid to swirl by introducing the liquid in a tangential direction of the processing tank and generates a gas phase in a swirling flow of the liquid;
a discharge portion that is disposed at a second end of the processing tank and discharges the liquid introduced from the liquid introduction port;
a plate-shaped second electrode that is disposed at the second end of the processing tank;
an opening portion that is formed in the second electrode with a central axis of the processing tank as a center; and
a power supply that applies a voltage between the first electrode and the second electrode,
wherein an outer diameter of the insulator is smaller than an outer diameter of a gas-phase generating space where the gas phase is generated in the processing tank.

2. The liquid processing apparatus of claim 1,
wherein the first electrode includes an exposed portion protruding from the insulator into the processing tank.

3. The liquid processing apparatus of claim 1,
wherein the outer diameter of the insulator is 0.1 mm or more, and is larger than 0% and 30% or less of a diameter of the opening portion.

4. The liquid processing apparatus of claim 2,
wherein the outer diameter of the insulator is 0.1 mm or more, and is larger than 0% and 30% or less of the diameter of the opening portion.

5. The liquid processing apparatus of claim 1, further comprising:
an electrode support cylinder that supports the first electrode disposed to protrude from the inner wall of the first end of the processing tank into the processing tank,
wherein in the first electrode supported by the electrode support cylinder, a side surface of the first electrode in a vicinity of the electrode support cylinder, which is protruded from the electrode support cylinder, is covered with the insulator.

6. The liquid processing apparatus of claim 2, further comprising:
an electrode support cylinder that supports the first electrode disposed to protrude from the inner wall of the first end of the processing tank into the processing tank,
wherein in the first electrode supported by the electrode support cylinder, a side surface of the first electrode in a vicinity of the electrode support cylinder, which is protruded from the electrode support cylinder, is covered with the insulator.

7. The liquid processing apparatus of claim 3, further comprising:
an electrode support cylinder that supports the first electrode disposed to protrude from the inner wall of the first end of the processing tank into the processing tank,
wherein in the first electrode supported by the electrode support cylinder, a side surface of the first electrode in a vicinity of the electrode support cylinder, which is protruded from the electrode support cylinder, is covered with the insulator.

8. The liquid processing apparatus of claim 4, further comprising:
an electrode support cylinder that supports the first electrode disposed to protrude from the inner wall of the first end of the processing tank into the processing tank,
wherein in the first electrode supported by the electrode support cylinder, a side surface of the first electrode in a vicinity of the electrode support cylinder, which is protruded from the electrode support cylinder, is covered with the insulator.

* * * * *